L. R. STOCKBRIDGE.

Assignor, by mesne assignments, to A. B. CROFOOT, E. T. STELLE, and A. A. CASS.

Balmoral, or Laced Boot.

No. 8,128. Reissued March 19, 1878.

WITNESSES:
Forde R. Smith
W. A. Caswell.

INVENTOR:
Lyman R. Stockbridge
by Munday & Evarts
attys.

N. PETERS, PHOTO-LITHOGRAPHER, WASHINGTON, D. C.

UNITED STATES PATENT OFFICE.

LYMAN R. STOCKBRIDGE, OF HAVERHILL, MASSACHUSETTS, ASSIGNOR, BY MESNE ASSIGNMENTS, TO ADELBERT B. CROFOOT, EDWARD T. STELLE, AND ANDREW A. CASS.

IMPROVEMENT IN BALMORALS OR LACED BOOTS.

Specification forming part of Letters Patent No. 114,724, dated May 9, 1871; Reissue No. 8,128, dated March 19, 1878; application filed December 17, 1877.

*To all whom it may concern:*

Be it known that I, LYMAN R. STOCKBRIDGE, of Haverhill, in the county of Essex and State of Massachusetts, have invented a new and useful Improvement in Balmoral or Laced Boots; and I do hereby declare the following to be a full, clear, and exact description of the same, reference being had to the accompanying drawings, making a part thereof.

Figure 1:
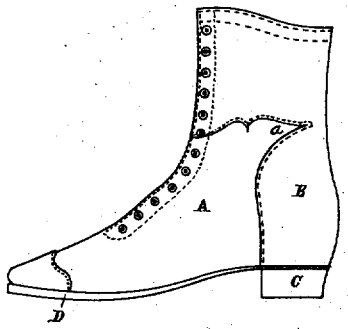
Figure 4:
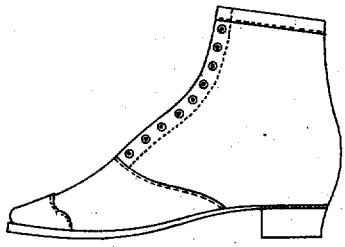
Figure 2:
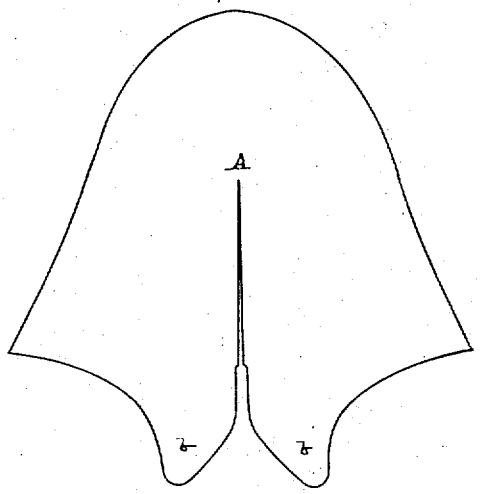
Figure 3:
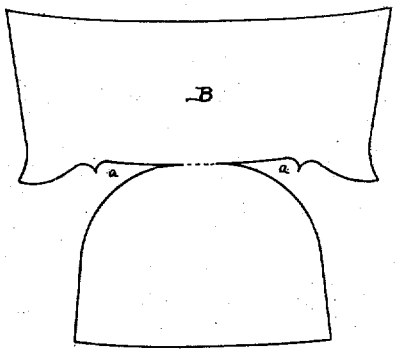

Of such drawings, Figure 1 is a side elevation of a laced boot made in accordance with my principle or invention. Fig. 2 is a view of the vamp or front developed on a plane surface, or as it appears when cut from a sheet or piece of leather. Fig. 3 is a view of the quarters or rear portion as developed on a plane surface. Fig. 4 is a side view of a laced boot of the ordinary construction.

The nature of my invention consists in a peculiar cut or formation of the vamp and quarters of a laced boot, whereby I am enabled to give to the rear portion of the boot a curvature corresponding to the natural contour of a person's heel and the part or parts of the leg next adjacent thereto, and this without having any seam running up the back part of the heel of the boot in the usual manner.

In carrying out my invention I cut the vamp and the quarters of two pieces of leather.

In the said drawings, A denotes the vamp, and B the piece constituting the quarters of the boot. C is the heel, and D the sole, of the boot.

The object of my invention is to produce a boot or balmoral with as few seams as possible, and at the same time retain its integrity of form and present a neat and graceful appearance.

It is a fact well known to those skilled in the art to which my invention appertains that many attempts have been made to produce a good-fitting balmoral or laced boot with its quarters cut from one piece of leather, so as to avoid having a seam running up the rear part of the boot.

It is also equally well known that, although they have accomplished the latter, they have invariably sacrificed the shape in attaining such result.

By my peculiar mode of cutting the quarters of the boot—that is, with an opening, *a*, extending back into each quarter and beyond the joint of the ankle or the point at which the ankle-joint would come when placed within the boot, the same being shown in Figs. 1 and 2, and cutting the rear part of the vamp or front of the boot with long extensions or tongues *b b*, to correspond with and fill the openings *a a*—I am enabled to produce a boot without any heel-seam, and having the graceful outline desired.

The two parts A and B are to be united together in the usual manner by sewing, which may be done either by hand or with a sewing-machine.

The other portions of the boot or balmoral are to be constructed in the ordinary manner.

I would remark that in case the leather should not be large enough to form the quarters in one piece, two pieces may be used, the line of junction under such circumstances being shown in dotted lines in Fig. 3.

I do not claim, broadly, making a balmoral boot or shoe without any heel-seam running up the back of the same, as I am aware that such is not new; nor do I claim the invention as shown in Letters Patent No. 52,732, in which the upper requires to be crimped in order to give the desired shape to the heel portion, as by my peculiar "cut" or formation of the parts the crimping of any portion of the upper becomes entirely unnecessary.

What I do claim as my invention is—

1. My improved balmoral or laced boot, having its upper or parts A and B formed and applied together substantially in manner as described and represented, the said part A being formed with extensions or tongues *b b*, to extend back of the ankle-point of the boot, and into corresponding openings *a a* made in the part B, as and for the purpose set forth.

2. A shoe whereof the quarters are made of a continuous piece, cut, spread, and held apart by inserted filling, substantially as shown and described, to give the desired form and contour to the leg and ankle at the back without crimping.

LYMAN R. STOCKBRIDGE.

Witnesses:

DANIEL C. BARTLETT,

E. B. GEORGE.